April 19, 1932. F. C. CRAWFORD 1,854,925
SAFETY TIE ROD
Filed April 11, 1927
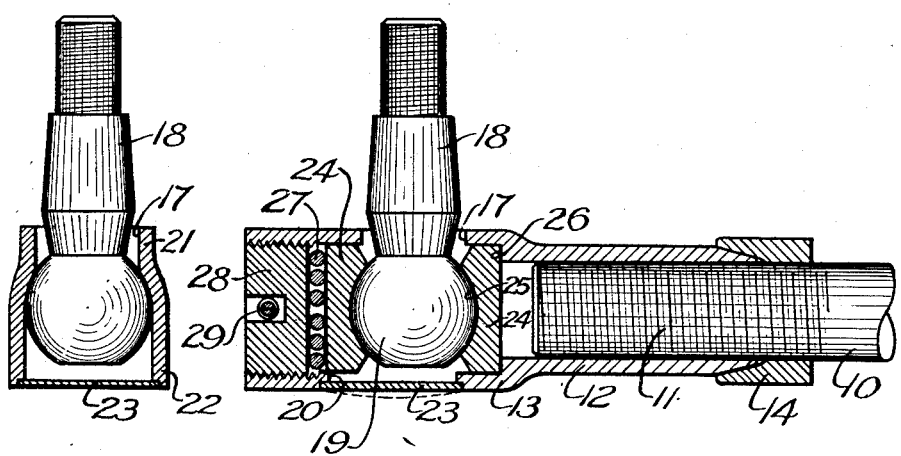
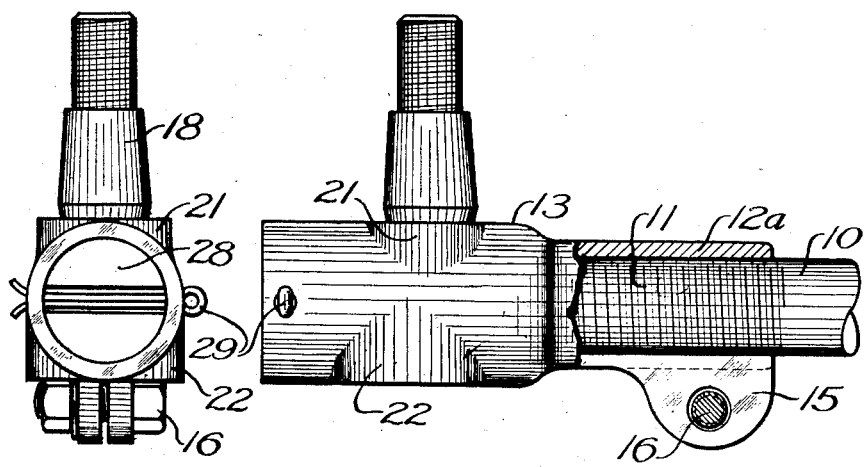
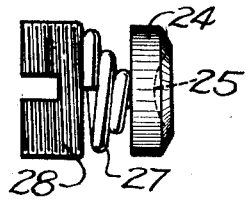
Inventor
Frederick C. Crawford
by Charles H. Wells
Attys.

Patented Apr. 19, 1932

1,854,925

UNITED STATES PATENT OFFICE

FREDERICK C. CRAWFORD, OF DETROIT, MICHIGAN, ASSIGNOR TO THOMPSON PRODUCTS, INC., OF CLEVELAND, OHIO, A CORPORATION OF OHIO

SAFETY TIE ROD

Application filed April 11, 1927. Serial No. 182,695.

This invention relates to ball joint connections for the ends of tie rods and drag links such as are used in the steering mechanisms of automotive vehicles.

The general object of this invention is to provide a ball joint connection construction that is safe, strong, and durable, combined with a structure readily assembled and serviced, suitable for economical manufacture, and in which looseness and rattling of the joint is prevented.

It is another object of this invention to provide a ball joint connection wherein the ball is inserted from the bottom and a cover secured thereover so that even if the bearings for the ball come loose or actually fall out, the tie rod or drag link cannot become detached from the ball, this being an important safety feature as a vehicle would become uncontrollable if any of the drag link or tie rod connections should become disconnected.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical cross section of a ball joint embodying the features of this invention.

Figure 2 is a section on the line II—II of Figure 1.

Figure 3 is an end elevation of a slightly modified form of the device.

Figure 4 is a side elevation of the modified form of Figure 3 partly in section disclosing a modified form of connection to the tie rod proper.

Figure 5 is a disassembled view of one ball seat with the spring and plug.

As shown on the drawings:

A tie rod 10 has been chosen for illustration, its end being threaded at 11 to adjustably receive the corresponding internally threaded extension 12 of the socket member or shell 13. After this adjustment has been made, which governs the toe-in of the steering wheels, a jam nut 14 with a conical surface is screwed up against the correspondingly tapered end of the extension 12 to tightly wedge the extension onto the tie rod, as shown in Figure 2. As an alternative procedure, the extension 12ª may be split and flanged as at 15 in Figure 4 and a bolt 16 used to clamp the extension onto the tie rod to preserve the adjustment.

The socket member or shell 13 forms an enlarged cylindrical continuation of the extention 12 and an aperture 17 is provided in the top for the stem 18 of a spherical ball 19, the aperture 17 being too small to permit passage of the ball 19, but providing a limited side clearance for the stem. A second aperture 20 is provided in the bottom of the shell 13 offset to the left of the axis of the first aperture, this second aperture being large enough to permit the passage of the ball 19, the lower aperture being offset to provide room for the insertion of the ball when the inner ball seat is in place. As it is desirable, but not essential, to have the outer edges of these apertures form a plane surface to simplify the form of closures therefor the shell is drawn out into cylindrical bosses 21 and 22 around each aperture, as indicated in the elevational views. The lower aperture 20 is permanently sealed by a cover 23 after the ball and bearings have been assembled in the shell, this cover being preferably of an initial convex form which is sprung into place as a flat disk.

The cylindrical shell 13 forms a housing for two ball seats 24, one disposed on either side of the ball 19, these seats being of substantially disk-like form with spherically formed depressions 25 in one face to bear against the ball 19.

It will be evident that the inner ball seat, which seats against a shoulder 26 provided by the extension 12, is held in place by the ball 19 when once assembled. The outer ball seat is resiliently urged against the ball by a helical spring 27 backed by a plug 28 screwed into the open end of the shell 13 and held by a cotter pin 29, the plug being screwed in until it takes up practically the entire movement of the spring, as shown in Figure 2, in order that spring failure can only result in a slight loosening up of the connection as a whole. As wear occurs on the ball or ball seats this spring tends to take up any lost motion produced by such wear, thus preventing rattling. Even though the plug 28, spring 27, and the outer ball seat should drop out the connection between the ball 19 and the shell 13 is maintained as the aperture 17 is too small to permit the withdrawal of the ball therethrough.

In assembling the parts one of the ball seats 24 is inserted against the shoulder 26 and the ball 19 and stem 18 inserted through the aperture 20, which is then permanently sealed by a sprung-in cover 23 so that thereafter the ball is not removable. The outer ball seat is then inserted backed by the spring 27 and plug 28 which is removably secured by the cotter pin 29 in order that these parts may be removed for inspection and adjustment.

It will thus be seen that I have provided an improved form of ball joint having the advantages of simplicity and extreme safety accompanied by economy of production and ease of inspection and adjustment to compensate for wear.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

A ball joint coupling adapted to engage a spherical ball on the end of a stem comprising a cylindrical shell open at one end, said shell having oppositely disposed apertures having flanges therearound forming plane surfaces, one aperture being of a size suitable for the insertion of a ball stem while the other is of a larger size suitable to permit the insertion of the ball therethrough, a permanent seal for said second larger aperture, a reduced extension of said shell opposite the open end for attachment to the end of a tie rod, said reduced extension forming a shoulder, a ball seat positioned between the shoulder and the ball, a second ball seat engaging said ball diametrically opposite to said first mentioned ball seat, and means for retaining said second ball seat in position.

In testimony whereof I have hereunto subscribed my name at Detroit, Wayne County, Michigan.

FREDERICK C. CRAWFORD.